US010494533B2

(12) United States Patent
De Rossi et al.

(10) Patent No.: US 10,494,533 B2
(45) Date of Patent: Dec. 3, 2019

(54) COATING AND PRODUCTION METHOD THEREOF BY INKJET PRINTING METHODS

(71) Applicant: MANKIEWICZ GEBR. & Co. GmbH & Co. KG, Hamburg (DE)

(72) Inventors: Umberto De Rossi, Norderstedt (DE); Veronica Rueter, Hamburg (DE); Klaus Ammann, Ostrach Burgweiler (DE)

(73) Assignee: MANKIEWICZ GEBR. & Co. GmbH & Co. KG, Hamburg (DE)

( * ) Notice: Subject to any disclaimer, the term of this patent is extended or adjusted under 35 U.S.C. 154(b) by 217 days.

(21) Appl. No.: 14/178,393

(22) Filed: Feb. 12, 2014

(65) Prior Publication Data
US 2014/0161986 A1 Jun. 12, 2014

Related U.S. Application Data

(62) Division of application No. 12/998,858, filed as application No. PCT/DE2009/001612 on Nov. 17, 2009, now abandoned.

(30) Foreign Application Priority Data

Dec. 19, 2008 (DE) .................. 10 2008 063 837

(51) Int. Cl.
*C09D 11/30* (2014.01)
*C09D 11/322* (2014.01)

(52) U.S. Cl.
CPC ............ *C09D 11/30* (2013.01); *C09D 11/322* (2013.01); *Y10T 428/24802* (2015.01)

(58) Field of Classification Search
CPC ... B05D 5/06; B05D 7/58; B05D 1/02; B05D 7/57; B05D 2203/35; B05D 1/26; B41M 5/0047; B41M 5/0064; B41M 5/007; B41M 7/0027; B41M 5/0011; B41M 7/0072; C09D 11/30; C09D 11/322; Y10T 428/24802
USPC ........................................ 427/510
See application file for complete search history.

(56) References Cited

U.S. PATENT DOCUMENTS

| 4,105,806 | A | | 8/1978 | Watt | |
|---|---|---|---|---|---|
| 4,309,452 | A | * | 1/1982 | Sachs | B05D 3/067 427/494 |
| 4,906,170 | A | | 3/1990 | Nelson et al. | |
| 5,200,438 | A | | 4/1993 | Fujii et al. | |
| 5,200,483 | A | | 4/1993 | Selvig | |
| 5,644,350 | A | | 7/1997 | Ando et al. | |
| 5,963,373 | A | * | 10/1999 | Kayanoki | C08G 18/381 351/159.57 |
| 6,000,793 | A | * | 12/1999 | Inamoto | B41M 7/0027 347/101 |
| 6,254,230 | B1 | | 7/2001 | Wen et al. | |
| 6,428,157 | B1 | | 8/2002 | Wen | |
| 6,607,267 | B2 | | 8/2003 | Testardi et al. | |
| 6,630,208 | B2 | * | 10/2003 | Tokimasa | G03C 1/74 427/209 |
| 6,720,042 | B2 | | 4/2004 | Ylitalo et al. | |
| 7,048,651 | B2 | | 5/2006 | Kennedy, III et al. | |
| 7,207,269 | B2 | | 4/2007 | Yoshida | |
| 7,279,506 | B2 | * | 10/2007 | Sisler | C08G 65/3322 106/31.13 |
| 7,290,874 | B2 | | 11/2007 | Codos | |
| 7,357,959 | B2 | | 4/2008 | Bauer | |
| 7,727,634 | B2 | | 6/2010 | Yacovone | |
| 7,891,802 | B2 | | 2/2011 | Gouch | |
| 8,104,884 | B2 | | 1/2012 | Tabayashi | |
| 8,153,195 | B2 | | 4/2012 | Tennis et al. | |
| 8,256,890 | B2 | | 9/2012 | Bauer | |
| 8,293,338 | B2 | | 10/2012 | Castelli et al. | |
| 8,857,977 | B2 | | 10/2014 | Grant et al. | |
| 2003/0021961 | A1 | | 1/2003 | Ylitalo et al. | |
| 2004/0142765 | A1 | | 7/2004 | Kennedy, III et al. | |
| 2004/0189778 | A1 | * | 9/2004 | Stork | B41M 5/52 347/105 |
| 2005/0024985 | A1 | | 2/2005 | Thomann et al. | |
| 2006/0004118 | A1 | | 1/2006 | Kunita | |
| 2006/0075917 | A1 | | 4/2006 | Edwards | |
| 2006/0078716 | A1 | | 4/2006 | Yacovone | |
| 2007/0046764 | A1 | | 3/2007 | Nakazawa | |
| 2007/0054128 | A1 | * | 3/2007 | Walker | C08G 59/18 428/413 |
| 2007/0085983 | A1 | | 4/2007 | Ko et al. | |

(Continued)

FOREIGN PATENT DOCUMENTS

CN 1715343 A 1/2006
CN 1939726 A 4/2007
(Continued)

OTHER PUBLICATIONS

English translation of the International Preliminary Report on Patentability in PCT/DE2009/001612 dated Jul. 21, 2011.
(Continued)

*Primary Examiner* — Robert S Walters, Jr.
(74) *Attorney, Agent, or Firm* — Collard & Roe, P.C.

(57) ABSTRACT

There are several coatings and a method for surface finishing, in particular for producing durable and stable surface coatings using ink jet printing methods. The coating comprises a first layer, which can be produced from one or more ink jet-capable inks, and a second layer, which can be produced from one or more top coats, wherein at least the first layer is applied using an ink jet print head.

22 Claims, No Drawings

(56) References Cited

U.S. PATENT DOCUMENTS

| | | | |
|---|---|---|---|
| 2007/0092703 A1* | 4/2007 | Leenders | B41M 3/14 428/195.1 |
| 2008/0167397 A1 | 7/2008 | Herlihy et al. | |
| 2008/0192102 A1 | 8/2008 | Leenders et al. | |
| 2008/0299315 A1 | 12/2008 | Iwase et al. | |
| 2009/0087576 A1 | 4/2009 | Umebayashi | |
| 2010/0068481 A1 | 3/2010 | Bauer | |
| 2010/0221504 A1 | 9/2010 | Bauer | |
| 2010/0302304 A1 | 12/2010 | Bauer | |
| 2011/0274891 A1 | 11/2011 | De Rossi et al. | |

FOREIGN PATENT DOCUMENTS

| | | |
|---|---|---|
| CN | 101178452 A | 5/2008 |
| CN | 101184628 A | 5/2008 |
| CN | 101397424 A | 4/2009 |
| DE | 102 24 128 A1 | 12/2003 |
| DE | 103 23 412 A1 | 12/2004 |
| DE | 100 31 030 B4 | 8/2005 |
| DE | 602 01 823 T2 | 11/2005 |
| DE | 10 2007 017 503 B3 | 11/2008 |
| DE | 10 2007 021 765 A1 | 11/2008 |
| DE | 10 2007 022 919 A1 | 11/2008 |
| DE | 10 2008 025 241 A | 12/2008 |
| DE | 10 2008 025 241 A1 | 12/2008 |
| EP | 0 671 268 A1 | 9/1995 |
| EP | 0 958 922 A2 | 11/1999 |
| EP | 1 048 466 A2 | 11/2000 |
| EP | 1 057 646 A2 | 12/2000 |
| EP | 1 593 521 A2 | 11/2005 |
| EP | 1 645 605 A1 | 4/2006 |
| EP | 1 726 443 A1 | 11/2006 |
| EP | 1 821 576 A1 | 8/2007 |
| EP | 1 860 923 A1 | 11/2007 |
| EP | 1923224 A1 | 5/2008 |
| EP | 2 028 237 A1 | 2/2009 |
| EP | 2 050 886 A2 | 4/2009 |
| EP | 2 110 256 A1 | 10/2009 |
| EP | 2 061 845 B1 | 11/2010 |
| EP | 2 358 541 B1 | 9/2015 |
| GB | 2390332 A | 1/2004 |
| JP | S62-26905 A | 2/1987 |
| JP | 6-226905 A | 8/1994 |
| JP | 2007-292776 A | 11/2007 |
| WO | 2006/111707 A1 | 10/2006 |
| WO | 2006/128839 A1 | 12/2006 |
| WO | 2008/138489 A1 | 11/2008 |
| WO | 2010/069286 A1 | 6/2010 |

OTHER PUBLICATIONS

DIN EN ISO 2409, Aug. 2007, eighteen (18) pages. (Spec, pp. 18 and 21).

DIN EN ISO 6270-2, Sep. 2005, twelve (12) pages. (Spec, pp. 18 and 21).

DIN ISO 105-A02, Sep. 1993, eight (8) pages. (Spec, pp. 18 and 21).

DEN EN ISO 105-X12, Dec. 2002, eight (8) pages. (Spec, pp. 18 and 21).

DIN EN ISO 4628-1, Jan. 2004, seven (7) pages. (Spec, pp. 18 and 21).

DIN EN ISO 1518, Sep. 2000, ten (10) pages. (Spec, pp. 18 and 21).

* cited by examiner

COATING AND PRODUCTION METHOD THEREOF BY INKJET PRINTING METHODS

CROSS REFERENCE TO RELATED APPLICATIONS

This patent application claims priority under 35 U.S.C. 120 and 35 U.S.C. 121, and is a divisional patent application of U.S. patent application Ser. No. 12/998,858 filed Jun. 9, 2011, which application is the National Stage of PCT/DE2009/001612 filed on Nov. 17, 2009, which claims priority under 35 U.S.C. § 119 of German Application No. 10 2008 063 837.4 filed on Dec. 19, 2008, the disclosure of which is incorporated by reference. The international application under PCT article 21(2) was not published in English.

BACKGROUND OF THE INVENTION

1. Field of the Invention

The present invention relates to coatings and methods for surface refinement, in particular for the production of permanent and stable surface coatings using inkjet printing methods.

2. The Prior Art

The term inkjet technology is understood below as meaning both inkjet and drop-on-demand methods. In particular, inks of any desired composition can be used in the drop-on-demand method. Inkjet technology is a digital printing technique that also makes it possible to produce very small print runs and/or batches down to a single item without an increase in the setup times. This technique is thus outstandingly suitable for the individualization of items.

It is, moreover, a non-impact technology, that is to say, the printing heads do not come into contact with the medium or substrate to be printed. This makes possible problem-free printing of a multiplicity of materials.

The use of the inkjet technology has hitherto been restricted, however, to media which make only small demands as such on mechanical and chemical stability and on resolution, or to media whose stabilities and resolution are improved by a suitable pretreatment, such as special inkjet papers, for example. Resolution is understood in this context as meaning the printed resolution as defined by the drop size and the positioning accuracy of the printing heads. Printed resolutions in the case of customary office printers (office sector) are in the range of up to 2880 dpi, and in the case of industrial applications (industrial sector) they are in the range of from 360 dpi to 1440 dpi.

The inks customarily employed in the inkjet printing method are also generally not adequately stable or resistant to make them suitable for applications in areas subject to high mechanical or physicochemical stresses, such as occur, for example, in the open.

EP 1 821 576 A1 and EP 1 860 923 A1 disclose methods for the production of electroluminescent display panels, in which images are applied to one side of a substrate and flat electrodes to the other side of the substrate by means of ink application implementing an inkjet printing method. To protect these prints against mechanical and chemical stresses, a further layer is laminated over the respective print.

Inkjet printing methods make high resolution and high printing speeds possible, which are moreover freely definable and infinitely variable. They are therefore also suitable for in-line decorating and refining processes. They can be adapted to the production flow, such that the production flow, more particularly the rate of production, can be maintained.

Restrictions in in-line production processes, however, result from the necessity to dry the inks employed. Printing with aqueous inks is therefore generally employed in the case of porous media, so that the coat applied hardens to an adequate extent before the next operation. With the use of solvent-containing inks, an appropriate drying zone is needed prior to the subsequent processing step, and such a drying zone is not always available in existing plants.

U.S. Pat. No. 4,906,170 discloses a method of marking pipes of plastics material by means of inkjet printers, in which a drying zone is inserted downstream of the printing unit. The drying zone is sufficiently long to avoid smudging of the print in the next step.

On account of the above drawbacks, especially as regards the stability factors, inkjet printing methods have not been employed hitherto in industrial processes for surface refinement.

SUMMARY OF THE INVENTION

It is thus an object of the present invention to provide improved surface refinements that in particular allow the advantages of inkjet technology to be utilized.

This object is achieved by a layer architecture as defined in the invention, and by a method as defined in the present invention. Preferred embodiments are disclosed in the description.

The coating of the invention comprises a first coat which provides a colored illustration, such as a pattern, by the application of colored inks with the aid of an inkjet printer. A second, transparent coat consisting of one or more covering layers (or top coats) is superposed on this first coat for the purpose of protecting said first, colored coat.

In a preferred embodiment, customary inks suitable for inkjet methods are employed. Suitable inks contain, for example, pigments, oligomers, reactive diluents and other additives familiar to the person skilled in the art. Suitable pigments are, for example, Pigment Yellow 213, PY 151, PY 93, PY 83, Pigment Red 122, PR 168, PR 254, PR 179, Pigment Red 166, Pigment Red 48:2, Pigment Violet 19, Pigment Blue 15:1, Pigment Blue 15:3, Pigment Blue 15:4, Pigment Green 7, Pigment Green 36, Pigment Black 7 or Pigment White 6. Suitable oligomers are, for example, aliphatic and aromatic urethane acrylates, polyether acrylates and epoxyacrylates, which acrylates may optionally be monofunctional or polyfunctional, e.g. difunctional, trifunctional to hexafunctional, and decafunctional. Suitable reactive diluents are, for example, dipropylene glycol diacrylate, tripropylene glycol diacrylate, tetrahydrofurfuryl acrylate, isobornyl acrylate and isodecyl acrylate. Further additives may be added to the inks for adjustment of their properties, such as, for example, dispersant additives, antifoams, photoinitiators, and UV absorbers.

Particularly preferred, according to the invention, are UV curing inks, which cure comparatively quickly and thus make rapid further processing possible. However, water-containing or solvent-containing inks are also suitable.

Particularly suitable inks are those that have a viscosity at the jetting temperature in the range of from 2 to 80 mPas, and which in the cured state have a surface energy in the range of from 20 to 50 mN/m, preferably in the range of from 25 to 40 mN/m and more preferably in the range of from 26 to 35 mN/m.

In a further preferred embodiment, customary covering layers are employed. Suitable covering layers are, for example, products based on single-component (1C) or two-component (2C) isocyanate crosslinking systems (polyurethanes) or based on 1C or 2C epoxy systems (epoxy resins). According to the invention, 2C systems are preferably employed. The covering layer employed according to the invention can be transparent or translucent.

In two-component isocyanate crosslinking systems, isocyanates such as, for example, oligomers based on hexamethylene diisocyanate (HDI), diphenylmethane diisocyanate (MDI), isophorone diisocyanate (IPDI), or toluidine diisocyanate (TDI), e.g. isocyanurates, biuret, allophanates, and adducts of the isocyanates mentioned with polyhydric alcohols and mixtures thereof are employed as the curing component. Polyols such as, for example, OH group-containing polyesters, polyethers, acrylates and polyurethane, and mixtures thereof, are employed as the binding component, which polyols may be solvent-based, solvent-free, or water-dilutable.

In two-component epoxy systems, epoxy resins such as, for example, glycidyl ethers of bisphenols such as bisphenol A or bisphenol F and epoxidized aliphatic parent substances, and mixtures thereof, are employed as the binding component. NH-functional substances such as, for example, amines, amides and adducts of epoxy resins and amines, and mixtures thereof, are employed as the curing component.

A preferred, two-component covering layer according to the invention contains as the binding component, for example, from 10 to 70%, preferably from 20 to 60% and more preferably from 30 to 40%, of polyols or epoxy resins, from 0 to 2%, preferably from 0 to 1% and more preferably from 0 to 0.5%, of flatting agents, from 0 to 10%, preferably from 0 to 5% and more preferably from 0 to 3%, of waxes, from 0 to 5%, preferably from 0.1 to 4% and more preferably from 0.1 to 2%, of accelerators, from 0 to 3%, preferably from 0.1 to 2% and more preferably from 0.1 to 0.5%, of silicones, from 0 to 10%, preferably from 0 to 2% and more preferably from 0 to 0.5%, of pigments, and from 0 to 10%, preferably from 0 to 2% and more preferably from 0 to 0.5%, of dyes, the percentages being based on the total weight of the binding component. Other additives such as antifoams and light screens can additionally be included.

In the case of polyol-containing binders, customary commercial isocyanate curing agents and in the case of epoxy resin-containing binders, NH-functional curing agents can be employed as the curing component.

The mixing ratios of the binder and curing components are selected such that the weights of the respective components, in each case based on the amount of substance of the reactive groups, are present in an OH:NCO or epoxy:NH ratio in the range of from 1:0.7 to 1:1.5, preferably from 1:0.8 to 1:1.2 and more preferably 1:1.

A further preferred embodiment of the present invention includes a further coat, which can be prepared from one or more primers and to which the first ink-containing coat is applied.

The 3-layer architecture according to the invention can be employed in various industrial sectors. The basecoat is formed by primers that can be applied to wood, metal, glass, and plastics materials. Examples of suitable primers for use in the present invention are products based on single-component (1C) or two-component (2C) isocyanate crosslinking systems (polyurethanes) or based on 1C or 2C epoxy systems (epoxy resins). According to the invention, 2C systems are preferably employed.

In two-component, isocyanate-cross-linking systems, isocyanates such as, for example, oligomers based on HDI, MDI, IPDI, or TDI such as, for example, isocyanurates, biuret, allophanates and adducts of the isocyanates mentioned with polyhydric alcohols, and mixtures thereof, are employed as the curing component. Polyols such as, for example, OH group-containing polyesters, polyethers, acrylates and polyurethanes, and mixtures thereof, are employed as the binding component, which polyols may be solvent-based, solvent-free, or water-dilutable.

In two-component epoxy systems, epoxy resins, such as, for example, glycidyl ethers of bisphenols such as bisphenol A or bisphenol F and epoxidized aliphatic parent substances, and mixtures thereof, are employed as the binding component. NH-functional substances such as, for example, amines, amides and adducts of epoxy resins and amines, and mixtures thereof, are employed as the curing component.

A preferred, two-component primer according to the invention contains, for example, from 10 to 70%, preferably from 20 to 60% and more preferably from 30 to 40%, of polyols or epoxy resins, from 0 to 10%, preferably from 0 to 7% and more preferably from 0 to 5%, of flatting agents, from 0 to 5%, preferably from 0 to 3%, of waxes, from 0 to 5%, preferably from 0.1 to 4% and more preferably from 0.1 to 2%, of accelerators, from 0 to 1%, preferably from 0 to 0.8% and more preferably from 0 to 0.5%, of dispersants, from 0 to 3%, preferably from 0.1 to 2% and more preferably from 0.1 to 1%, of wetting agents, from 0 to 3%, preferably from 0.1 to 2% and more preferably from 0.1 to 0.5%, of silicones, from 0 to 60%, preferably from 1 to 20% and more preferably from 1 to 10%, of pigments and from 0 to 60%, preferably from 0 to 20% and more preferably from 1 to 10%, of fillers as the binding component, the percentages being based on the total weight of the binding component. Further additives such as antifoams and adhesion promoters can additionally be included to assist adhesion to the respective undercoat.

In the case of polyol-containing binders, conventional commercial isocyanate curing agents, and in the case of epoxy resin-containing binders, NH-functional curing agents can be employed as the curing component.

The mixing ratios of the binder and curing components are selected such that the weights of the respective components, in each case based on the amount of substance of the reactive groups, are present in an OH:NCO or epoxy:NH ratio in the range of from 1:0.7 to 1:1.5, preferably from 1:0.8 to 1:1.2 and more preferably 1:1.

According to the invention, the desired pattern or decoration is printed on this primer coat using a suitable ink by means of a conventional commercial inkjet printing head. Subsequently, the printed coat is sealed using a suitable covering layer. The covering layer and the primer are preferably applied by means of spray guns, and it is particularly preferred to apply the covering layer likewise by means of inkjet printing methods. The primer layer and the covering layer, however, can alternatively be applied using the customary application methods as are known to the person skilled in the art, e.g. by brush coating, airbrush coating, knife coating, or roller coating.

UV curing inks and UV curing covering layers are very preferably employed according to the invention, in order that printing and sealing can be carried out at a rate that complies with the requirements of a customary industrial process.

Using the particularly preferred 3-layer architecture according to the invention, inkjet prints on plastics materials such as normal ABS (acrylonitrile-butadiene-styrene copolymer) or ABS-PC (acrylonitrile-butadiene-styrene copolymer with polycarbonate) and in particular on critical materials such as, for example, glass and melamine, e.g. melamine laminates or melamine-coated materials are so stable that they comply with the customary furniture standards and automobile specifications.

Hitherto, the production of a haptical effect, such as embossing, has only been economical when very large volumes or batches have been involved. Although digital technologies such as the inkjet technology are being discussed for graphical individualization of surfaces, it has not yet been possible to produce, in particular, any haptical individualization, since the amounts of ink customarily applied are too small to achieve a haptical effect. Even 100% UV ink systems intended for curing do not produce any adequate embossed effect.

Generally, therefore, auxiliary media such as, for example, quartz sand are used for objects to be produced by inkjet technology. These auxiliary media build up the object, while the inkjet printer merely prints an "adhesive track" to produce a coherent coat of auxiliary medium. The 3-layer architecture according to the invention now makes it possible to combine haptical and graphical and/or coloristic individualization in one method step.

According to the invention, the first coat comprises a coloristic design such as a pattern or decoration on the substrate produced by the application of UV-curable inks by means of an inkjet printer. Particularly suitable inks are those which have a viscosity in the range of from 2 to 80 mPas at the jetting temperature.

The subsequent coat, which contains an inkjectable UV lacquer as a covering layer, is applied only at a few points of the color pattern likewise by means of an inkjet printer. The combination of the visual, graphical and coloristic effects of the design having a three-dimensional architecture produces a haptical look and feel.

The covering layer employed according to the invention for the production of the second coat preferably contains from 5 to 50% of oligomer and from 20 to 80% of monofunctional, difunctional, and/or trifunctional reactive diluents, based on the weight of the covering layer.

The covering layer of the invention need only partially wet the substrate. The covering layer used can be a non-pigmented variant of the UV ink employed according to the invention, for example. The UV curing inks such as, for example, CYMK are applied using conventional printers. Following printing of the ink-containing coat, the print can be cured. It is also possible within the scope of the present invention to carry out only pinning such that the surface has begun to gel, but the ink is not yet dry. Subsequently, the covering layer is printed by means of the same or a modified inkjet printing head at exactly the same points at which the colored ink was previously printed. This can be repeated as often as desired and thus allows a successive buildup of coat thickness, and combines the haptical effect with graphical and coloristic decoration.

The object of the invention is furthermore achieved by a method of coating surfaces that includes the following steps: (a) printing an ink-containing coat, and (b) applying a coat containing one or a covering layer or layers. It is possible to apply both a plurality of ink-containing coats, for example in different colors, and a plurality of coats containing a covering layer or layers.

According to the invention, the ink-containing coat is preferably printed by means of an inkjet printer. The application of the primer-containing coat and/or the covering layer-containing coat is carried out according to one of the conventional application methods such as spray coating, brush coating, airbrush coating, knife coating, and roller coating or likewise by printing by means of an inkjet printer. Preferably, the application of the covering layer(s) in the coat system of the invention takes place by spray application or by printing by means of an inkjet printer. In particular, application by means of inkjet methods is particularly preferred when a relatively thick layer architecture is required.

The printing heads can also be applied to three-dimensionally movable units or devices such as, for example, robots or a similar setup, so that in this way the print can be applied, not only flat surfaces, but also to curved surfaces and three-dimensionally shaped objects.

According to the invention, the applied layers are preferably cured in UV light. In a further embodiment, the applied layers are exposed to light in an intermediate step using radiation of a wavelength of from 250 nm to 450 nm, e.g. using LEDs, before the application of the respective next layer, so as to congeal the surface of the layer (pinning). The entire structure is cured only after the application of the final coat or the covering layer.

The coating of the invention and the method for its production can be employed in various sectors. They make it possible to provide individual decoration of surfaces in very small batches without changeover costs and thus provide a wide freedom of artistry and design, particularly due to the combination of coloristic and graphical decoration with haptical decoration.

The methods according to the invention can be integrated without difficulty into existing (in-line) methods of lacquering substrates of wood, glass, ceramics, metal, and plastics. The method of the invention is particularly suitable for lacquering substrates of plastics materials consisting of, for example, vinyl chloride, acrylic-butadiene-styrene copolymer (ABS), acrylic-butadiene-styrene copolymer-polycarbonate (ABS-PC), polycarbonate (PC), acrylonitrile-styrene-acrylate (ASA), polypropylene (PP), filler-free or filled with, say, talc, polyamide (PA), filler-free or filled with, say, glass fibers or glass beads, polyoxymethylene (POM), polybutylene terephthalate (PBT), thermoplastic polyester elastomers (TPEE) and/or ethylene-propylene-diene rubber (PP-EPDM PP).

Preferably, the method of the invention is employed for the in-line refinement of plastics surfaces of any desired shape, especially PVC profiles.

Printing by the method of the invention is carried out, for example, using the 4-color or multicolor technique in a single-pass process downstream of an extruder. According to the invention, UV curing inks are preferably used that have an adequate curing rate for the production rate of the respective method, for example from 0.1 to 200 meters per minute (m/min) and preferably from 50 to 100 m/min. The ink-containing coat can furthermore be protected by further covering layers. The covering layer-containing coat(s) can likewise be applied by an inkjet method. However, other customary application methods, as are known to the person skilled in the art, can also be employed, such as, for example, brush coating, airbrush coating, spray coating, knife coating, or roller coating. Application can alternatively be carried out by vacuum lacquering in a vacumat. The function of the vacumat is based on the following principle. A liquid coating substance such as, for example, a colored lacquer, is vortexed in an application chamber with the aid of the sucking action of an applied negative pressure. The substrate to be coated is transported through the resultant lacquer mist. A uniform all-round coating is obtained.

A primer can optionally be applied to the substrate for improving the adhesion. The method according to the invention is suitable, for example, for providing a substrate surface with a uniform coloration in order to compensate for tolerances of different raw material batches and production batches. In order to guarantee adequate flow and wetting of the individual coats, the method can include a further exposure period (pinning) as an intermediate step.

In the in-line method according to the invention, use is preferably made of inks having a surface tension of less than 35 mN/m, more preferably less than 30 mN/m and even more preferably less than 26 mN/m.

The coating obtained according to the invention is preferably used on substrates of wood, glass, ceramics, metal, and plastics, more particularly on components for vehicle construction, such as, for example, bodywork components, external vehicle parts such as bumpers, protective strips, or mirrors, and on components for vehicle interior equipment (interior parts) such as decorative strips, coverings, handles, knobs, and consoles. It is also preferred to use the coating according to the invention in the furniture sector, for example for coating furniture surfaces.

The methods according to the invention are preferably employed for printing three-dimensionally shaped parts such as, for example, PVC profiles, more particularly window frames and door frames.

DETAILED DESCRIPTION OF PREFERRED EMBODIMENTS

Example 1: 3-Layer Architecture

Primer

Binding component (constituents based on the total weight of the binding component):

| | |
|---|---|
| acrylate-polyol | 22% |
| flatting agent | 5% |
| accelerator | 0.2% |
| wetting agent | 0.5% |
| dispersing agent | 0.2% |
| antifoaming agent | 0.2% |
| butyl acetate | 61.9% |
| solvent naphtha | 10% |

Curing Component:

conventional commercial isocyanate curing agent in a mixing ratio of 1:1

Ink (percentages based on the total weight of the ink:)

| | |
|---|---|
| pigment | 0 to 15% |
| oligomer | 5 to 50% |
| reactive diluent | 20 to 80% |
| further additives | 0 to 5% |

Covering Layer binding component (percentages based on the total weight of the binding component):

| | |
|---|---|
| acrylate-polyol | 25% |
| accelerator | 1% |
| wetting agent | 0.5% |
| flatting agent | 1% |
| light screen | 1% |
| solvent naphtha | 20% |
| butyl acetate | 51.5% |

Curing Component:

conventional commercial isocyanate curing agent in a mixing ratio of 1:1

Substrate

Glass, cleaned with isopropyl alcohol

The primer was applied by spraying. The primer coat was dried at room temperature for 24 hours. The ink was subsequently printed onto the substrate by means of an ORXY printer marketed by Swissqprint. The covering layer was applied by means of spray coating. The printed structure was checked 7 days later with the following results (see Table 1):

TABLE 1

| Test | Nominal value | Result |
|---|---|---|
| Cross-cut DIN EN ISO 2409 | ≤1 | OK |
| Condensation water constant climate DIN EN ISO 6270-2 CH, 240 h, 40° C.->95% rel. humidity then cross-cut (see above) | degree of blistering = 0 ≤1 | OK OK |
| ATLAS Suntest 240 h with quartz filter | delta E < 5 | OK |
| Drip test, cleaner's naphtha DIN EN ISO 105-A02 | 5 | OK |
| Care resistance test DIN EN ISO 105-X12, 9N, stroke: 50 mm, 30 DH; felt: 1 cm² glass cleaner | trace ≤ 1, felt ≤ 1 | OK |
| Wipe test with Crockmeter DIN EN ISO 105-X12, 9N, stroke: 50 mm, felt: 1 cm² Heat storage 240 h, 90° C.: | trace = 0, felt = 0 | OK |
| optical change DIN EN ISO 4628-1 | 0 | OK |
| haptical change DIN EN ISO 4628-1 | 0 | OK |
| cross-cut DIN EN ISO 2409 | ≤1 | OK |
| scratch resistance, Erichsen rod 318 DIN EN ISO 1518, 10N, Ø = 75 mm | no tearing | |

Example 2: 2-Layer Architecture

Ink:

| Constituent | Amount [% by weight] |
|---|---|
| Pigment | 0 to 15 |
| Oligomer | 5 to 50 |
| Reactive diluent (monofunctional, difunctional or trifunctional) | 20 to 80 |
| Further additives | 0 to 5 |

Covering Layer:

| Constituent | Amount [% by weight] |
| --- | --- |
| Oligomer | 5 to 50 |
| Reactive diluent (monofunctional, difunctional or trifunctional) | 20 to 80 |
| Further additives | 0 to 5 |

Substrate

PVC, cleaned with isopropyl alcohol (IPA)

The ink is printed onto the substrate by means of a conventional commercial printer such as, for example, Swissqprint ORXY or Durst RHO. Subsequently a covering layer is applied with a printing head as marketed by, for example, Konica Minolta or Fujifilm Dimatix, or likewise with a conventional commercial printer. Alternatively, the covering layer can be applied by spraying.

The object was tested 7 days later, giving the following results (see Table 2):

TABLE 2

| Test | Nominal value | Result |
| --- | --- | --- |
| Cross-cut DIN EN ISO 2409 | ≤1 | OK |
| Condensation water constant climate DIN EN ISO 6270-2 CH, 240 h, 40° C.->95% rel. humidity | degree of blistering = 0 | OK |
| then cross-cut (see above) | ≤1 | OK |
| ATLAS Suntest 240 h with quartz filter | delta E < 5 | OK |
| Drip test, cleaner's naphtha DIN EN ISO 105-A02 | 5 | OK |
| Care resistance test DIN EN ISO 105-X12, 9N, stroke: 50 mm, 30 DH; felt: 1 cm² glass cleaner | trace ≤ 1 felt ≤ 1 | OK |
| Wipe test with Crockmeter DIN EN ISO 105-X12, 9N, stroke: 50 mm, felt: 1 cm² | trace = 0, felt = 0 | OK |
| Heat storage 240 h, 90° C.: | | |
| optical change DIN EN ISO 4628-1 | 0 | OK |
| haptical change DIN EN ISO 4628-1 | 0 | OK |
| cross-cut DIN EN ISO 2409 | ≤1 | OK |
| scratch resistance, Erichsen rod 318 DIN EN ISO 1518, 10N, Ø = 75 mm | no tearing | |

What is claimed is:

1. A method for the application of a coating to a surface, or to a substrate,
   said coating comprising a primer, a first coat, which comprises one or more inks, and a second coat, which comprises one or more covering layers, wherein at least one ink is a UV curing ink and at least one covering layer is a UV curing lacquer;
   said method comprising in order the steps of
   (a) applying a primer, (b) printing at least one UV curing ink by means of an inkjet printer on said primer, (c) commencing gelling of the ink by irradiation with light exhibiting wavelengths of from 250 to 450 nm, (d) applying at least one covering layer by means of an inkjet printer, and (e) completely curing said coating over its entire structure with UV light;
   wherein said primer contains a binding component and a curing component in a mixing ratio of from 1:0.7 to 1:1.2, and wherein the mixing ratio is OH groups: NCO groups or epoxy groups: NH groups; and
   wherein said primer comprises a binding component containing
   from 10 to 70% by weight of polyalcohols or epoxy resins,
   from 5% to 10% by weight of flatting agent,
   from 0 to 5% by weight of waxes,
   from 0.1% to 2% by weight of accelerators,
   from 0.2% to 1% by weight of dispersing agent,
   from 0.1% to 2% by weight of wetting agent,
   from 0.1 to 2% by weight of silicones,
   from 0 to 60% by weight of pigments, and
   from 0 to 60% by weight of fillers
   based on the total weight of said binding component.

2. The method according to claim 1, wherein the primer is applied by spray coating.

3. The method as defined in claim 1, wherein the inks and/or covering layers are printed by means of an inkjet printing head capable of moving in three vertically superposed planes.

4. The method according to claim 1, wherein items of plastics materials are coated, in which the plastics materials are selected from the group consisting of plastics materials produced from vinyl chloride, acrylic-butadiene-styrene copolymer, acrylic-butadiene-styrene copolymer/polycarbonate, polycarbonate, acrylonitrile-styrene-acrylate, filler-free and filled polypropylene, filler-free and filled polyamide, poly(oxymethylene), poly(butylene terephthalate), thermoplastic polyester elastomers and ethylene-propylene-diene rubber.

5. The method according to claim 1, wherein PVC profiles are coated.

6. The method according to claim 1, wherein at least one ink comprises pigments, oligomers, and/or reactive diluents.

7. The method according to claim 1, wherein at least one ink contains from 0 to 15% of pigment, from 5 to 50% of oligomer, and from 20 to 80% of monofunctional, difunctional and/or trifunctional reactive diluent based on the weight of the ink.

8. The method according to claim 1, wherein said binding component of said primer contains polyalcohols and said curing component of said primer contains isocyanates.

9. The method according to claim 1, wherein said binding component of said primer contains epoxy resins and said curing component of said primer contains NH-functional substances.

10. The method according to claim 1, wherein the UV curing lacquer contains from 5 to 50% of oligomer and from 20 to 80% of monofunctional, difunctional and/or trifunctional reactive diluent based on the weight of the covering layer.

11. The method according to claim 1, wherein the covering layer wets the first coat only partially.

12. The method according to claim 1, wherein said inks in the cured state have a surface energy in the range of from 20 to 50 mN/m.

13. The method according to claim 1, wherein said inks have a surface tension of less than 35 mN/m.

14. A method for the application of a coating to a surface, or to a substrate,
   said coating comprising a primer, a first coat, which comprises one or more inks, and a second coat, which comprises one or more covering layers, wherein at least one ink is a UV curing ink and at least one covering layer is a UV curing lacquer;

said method comprising in order the steps of (a) applying a primer, (b) printing at least one UV curing ink by means of an inkjet printer on said primer, (c) commencing gelling of the ink by irradiation with light exhibiting wavelengths of from 250 to 450 nm, (d) applying at least one covering layer by means of an inkjet printer, and (e) completely curing said coating over its entire structure with UV light;

wherein said inks in the cured state have a surface energy in the range of from 20 to 50 mN/m; and wherein said primer comprises a binding component containing from 10 to 70% by weight of polyalcohols or epoxy resins,
from 5% to 10% by weight of flatting agent,
from 0 to 5% by weight of waxes,
from 0.1% to 2% by weight of accelerators,
from 0.2% to 1% by weight of dispersing agent,
from 0.1% to 2% by weight of wetting agent,
from 0.1 to 2% by weight of silicones,
from 0 to 60% by weight of pigments, and
from 0 to 60% by weight of fillers
based on the total weight of said binding component.

15. The method according to claim 14, wherein the surface energy is in the range of from 25 to 40 mN/m.

16. The method according to claim 14, wherein the surface energy is in the range of from 26 to 35 mN/m.

17. A method for the application of a coating to a surface, or to a substrate, said coating comprising a primer, a first coat, which comprises one or more inks, and a second coat, which comprises one or more covering layers, wherein at least one ink is a UV curing ink and at least one covering layer is a UV curing lacquer;

said method comprising in order the steps of (a) applying a primer, (b) printing at least one UV curing ink by means of an inkjet printer on said primer, (c) commencing gelling of the ink by irradiation with light exhibiting wavelengths of from 250 to 450 nm, (d) applying at least one covering layer by means of an inkjet printer, and (e) completely curing said coating over its entire structure with UV light;

wherein said inks have a surface tension of less than 35 mN/m; and wherein said primer comprises a binding component containing from 10 to 70% by weight of polyalcohols or epoxy resins,
from 5% to 10% by weight of flatting agent,
from 0 to 5% by weight of waxes,
from 0.1% to 2% by weight of accelerators,
from 0.2% to 1% by weight of dispersing agent,
from 0.1% to 2% by weight of wetting agent,
from 0.1 to 2% by weight of silicones,
from 0 to 60% by weight of pigments, and
from 0 to 60% by weight of fillers
based on the total weight of said binding component.

18. The method according to claim 17, wherein said surface tension is less than 30 mN/m.

19. The method according to claim 17, wherein said surface tension is less than 26 mN/m.

20. A method for the application of a coating to a surface, or to a substrate, said coating comprising a primer, a first coat, which comprises one or more inks, and a second coat, which comprises one or more covering layers, wherein at least one ink is a UV curing ink and at least one covering layer is a UV curing lacquer;

said method comprising in order the steps of (a) applying a primer, (b) printing at least one UV curing ink by means of an inkjet printer on said primer, (c) commencing gelling of the ink by irradiation with light exhibiting wavelengths of from 250 to 450 nm, (d) applying at least one covering layer by means of an inkjet printer, and (e) completely curing said coating over its entire structure with UV light;

wherein said primer contains a binding component and a curing component in a mixing ratio of from 1:0.7 to 1:1.2, and wherein the mixing ratio is OH groups: NCO groups; and wherein said primer comprises a binding component (constituents based on the total weight of the binding component) containing:

| | |
|---|---|
| acrylate-polyol | 22% by weight, |
| flatting agent | 5% by weight, |
| accelerator | 0.2% by weight, |
| wetting agent | 0.5% by weight, |
| dispersing agent | 0.2% by weight, |
| antifoaming agent | 0.2% by weight, |
| butyl acetate | 61.9% by weight, and |
| solvent naphtha | 10% by weight. |

21. A method for the application of a coating to a surface, or to a substrate, said coating comprising a primer, a first coat, which comprises one or more inks, and a second coat, which comprises one or more covering layers, wherein at least one ink is a UV curing ink and at least one covering layer is a UV curing lacquer;

said method comprising in order the steps of (a) applying a primer, (b) printing at least one UV curing ink by means of an inkjet printer on said primer, (c) commencing gelling of the ink by irradiation with light exhibiting wavelengths of from 250 to 450 nm, (d) applying at least one covering layer coat by means of an inkjet printer, and (e) completely curing said coating over its entire structure with UV light;

wherein said inks in the cured state have a surface energy in the range of from 20 to 50 mN/m; and wherein said primer comprises a binding component (constituents based on a total weight of the binding component) containing:

| | |
|---|---|
| acrylate-polyol | 22% by weight, |
| flatting agent | 5% by weight, |
| accelerator | 0.2% by weight, |
| wetting agent | 0.5% by weight, |
| dispersing agent | 0.2% by weight, |
| antifoaming agent | 0.2% by weight, |
| butyl acetate | 61.9% by weight, and |
| solvent naphtha | 10% by weight. |

22. A method for the application of a coating to a surface, or to a substrate, said coating comprising a primer, a first coat, which comprises one or more inks, and a second coat, which comprises one or more covering layers, wherein at least one ink is a UV curing ink and at least one covering layer is a UV curing lacquer;

said method comprising in order the steps of
(a) applying a primer, (b) printing at least one UV curing ink by means of an inkjet printer on said primer, (c) commencing gelling of the ink by irradiation with light exhibiting wavelengths of from 250 to 450 nm, (d) applying at least one covering layer by means of an inkjet printer, and (e) completely curing said coating over its entire structure with UV light;

wherein said inks have a surface tension of less than 35 mN/m; and wherein said primer comprises a binding component (constituents based on a total weight of the binding component) containing:

| | |
|---|---|
| acrylate-polyol | 22% by weight, |
| flatting agent | 5% by weight, |
| accelerator | 0.2% by weight, |
| wetting agent | 0.5% by weight, |
| dispersing agent | 0.2% by weight, |
| antifoaming agent | 0.2% by weight, |
| butyl acetate | 61.9% by weight, and |
| solvent naphtha | 10% by weight. |

* * * * *